(12) United States Patent
Chan

(10) Patent No.: US 12,255,531 B2
(45) Date of Patent: Mar. 18, 2025

(54) FULL-BRIDGE RESONANT CONVERTER CAPABLE OF SUPPRESSING HIGH-FREQUENCY DECOUPLING DISTORTION

(71) Applicant: Acer Incorporated, New Taipei (TW)

(72) Inventor: Tzu-Tseng Chan, New Taipei (TW)

(73) Assignee: Acer Incorporated, New Taipei (TW)

( * ) Notice: Subject to any disclaimer, the term of this patent is extended or adjusted under 35 U.S.C. 154(b) by 235 days.

(21) Appl. No.: 17/989,692

(22) Filed: Nov. 18, 2022

(65) Prior Publication Data

US 2023/0223842 A1 Jul. 13, 2023

(30) Foreign Application Priority Data

Jan. 13, 2022 (TW) .................................. 111101421

(51) Int. Cl.
*H02M 3/00* (2006.01)
*H02M 1/44* (2007.01)
*H02M 3/335* (2006.01)

(52) U.S. Cl.
CPC ............... *H02M 3/01* (2021.05); *H02M 1/44* (2013.01); *H02M 3/33573* (2021.05)

(58) Field of Classification Search
CPC ............... H02M 3/01; H02M 3/33569; H02M 3/33573; H02M 1/12; H02M 1/14; H02M 1/44

See application file for complete search history.

(56) References Cited

U.S. PATENT DOCUMENTS

| | | | | |
|---|---|---|---|---|
| 7,817,452 B2 * | 10/2010 | Smith | ............... | H02M 3/33573 363/56.02 |
| 2002/0039298 A1 * | 4/2002 | Riggio | .................... | H02M 1/14 363/22 |
| 2002/0044461 A1 * | 4/2002 | Jang | .................. | H02M 3/33573 363/17 |
| 2013/0301304 A1 * | 11/2013 | Murakami | ........ | H02M 3/33507 363/17 |
| 2014/0146572 A1 * | 5/2014 | Ye | .......................... | H02M 3/28 363/17 |
| 2014/0268899 A1 * | 9/2014 | Hosotani | ........... | H02M 3/33571 363/17 |

(Continued)

FOREIGN PATENT DOCUMENTS

| | | |
|---|---|---|
| CN | 101609970 | 12/2009 |
| TW | 201409886 | 3/2014 |

(Continued)

*Primary Examiner* — Gustavo A Rosario-Benitez
(74) *Attorney, Agent, or Firm* — JCIPRNET

(57) ABSTRACT

The disclosure provides a full-bridge resonant converter, including a full-bridge switching circuit, a transformer, a resonance tank, a secondary side circuit, and a damping circuit. The secondary side circuit includes a first output diode and a second output diode. When the current value of a current flowing through the first output diode and the second output diode is resonated to zero amperes, and a resonant current flowing through the resonance tank does not flow through a primary side winding of the transformer at all, the transformer and the secondary side circuit jointly provide an equivalent capacitance, and the damping circuit and the equivalent capacitance jointly perform a damping operation on the resonant current.

8 Claims, 5 Drawing Sheets

(56) References Cited

U.S. PATENT DOCUMENTS

| | | | | |
|---|---|---|---|---|
| 2020/0177073 A1* | 6/2020 | Davidson | ................ | H02M 3/01 |
| 2020/0395839 A1* | 12/2020 | Ayyanar | .............. | H02M 1/4208 |
| 2022/0014105 A1* | 1/2022 | Lukas | ................. | H02M 1/0058 |
| 2022/0294358 A1* | 9/2022 | Wang | ...................... | H02M 1/14 |

FOREIGN PATENT DOCUMENTS

| TW | 201545454 | 12/2015 |
|---|---|---|
| TW | 201720036 | 6/2017 |
| TW | 201914187 | 4/2019 |
| TW | 201947863 | 12/2019 |
| TW | I680632 | 12/2019 |

* cited by examiner

FULL-BRIDGE RESONANT CONVERTER CAPABLE OF SUPPRESSING HIGH-FREQUENCY DECOUPLING DISTORTION

CROSS-REFERENCE TO RELATED APPLICATION

This application claims the priority benefit of Taiwan application serial no. 111101421, filed on Jan. 13, 2022. The entirety of the above-mentioned patent application is hereby incorporated by reference herein and made a part of this specification.

BACKGROUND

Technical Field

The disclosure relates to a resonant converter, and more particularly to a full-bridge resonant converter suppressing a high-frequency decoupling distortion.

Description of Related Art

In high-power applications, a full-bridge resonant converter has the characteristics of flexible switching and adopts variable frequency operation to adjust the voltage gain to achieve the function of stable voltage output. Based on the high-frequency (greater than 180 kHz) switching operation, the volume of the power supply can be greatly reduced. However, when the full-bridge resonant converter performs the high-frequency switching operation, electromagnetic interference, etc., may occur.

SUMMARY

The disclosure provides a full-bridge resonant converter capable of suppressing a high-frequency decoupling distortion.

A full-bridge resonant converter according to an aspect of the disclosure includes a full-bridge switching circuit, a transformer, a resonance tank, a secondary side circuit, and a damping circuit. The transformer includes a primary side winding, a first secondary side winding, and a second secondary side winding. The resonance tank is coupled to the full-bridge switching circuit and the primary side winding. The secondary side circuit is coupled to the first secondary side winding and the second secondary side winding. The secondary side circuit includes a first output diode and a second output diode. The damping circuit is coupled to the full-bridge switching circuit. When the current value of a first current flowing through the first output diode is resonated to zero amperes, and a resonant current flowing through the resonance tank does not flow through the primary side winding at all, the transformer and the secondary side circuit jointly provides a first equivalent capacitance, and the damping circuit and the first equivalent capacitance jointly perform a first damping operation on the resonant current flowing through the resonance tank.

Based on the above, when the current value of the first current flowing through the first output diode is resonated to zero amperes, and the resonant current flowing through the resonance tank does not flow through the primary side winding at all, the full-bridge resonant converter provides a damping operation on the resonant current flowing through the resonance tank to suppress the high-frequency decoupling distortion. As a result, the full-bridge resonant converter is free from electromagnetic interference.

In order to make the aforementioned features and advantages of the disclosure comprehensible, embodiments accompanied with drawings are described in detail as follows.

DESCRIPTION OF THE EMBODIMENTS

Figure 1:
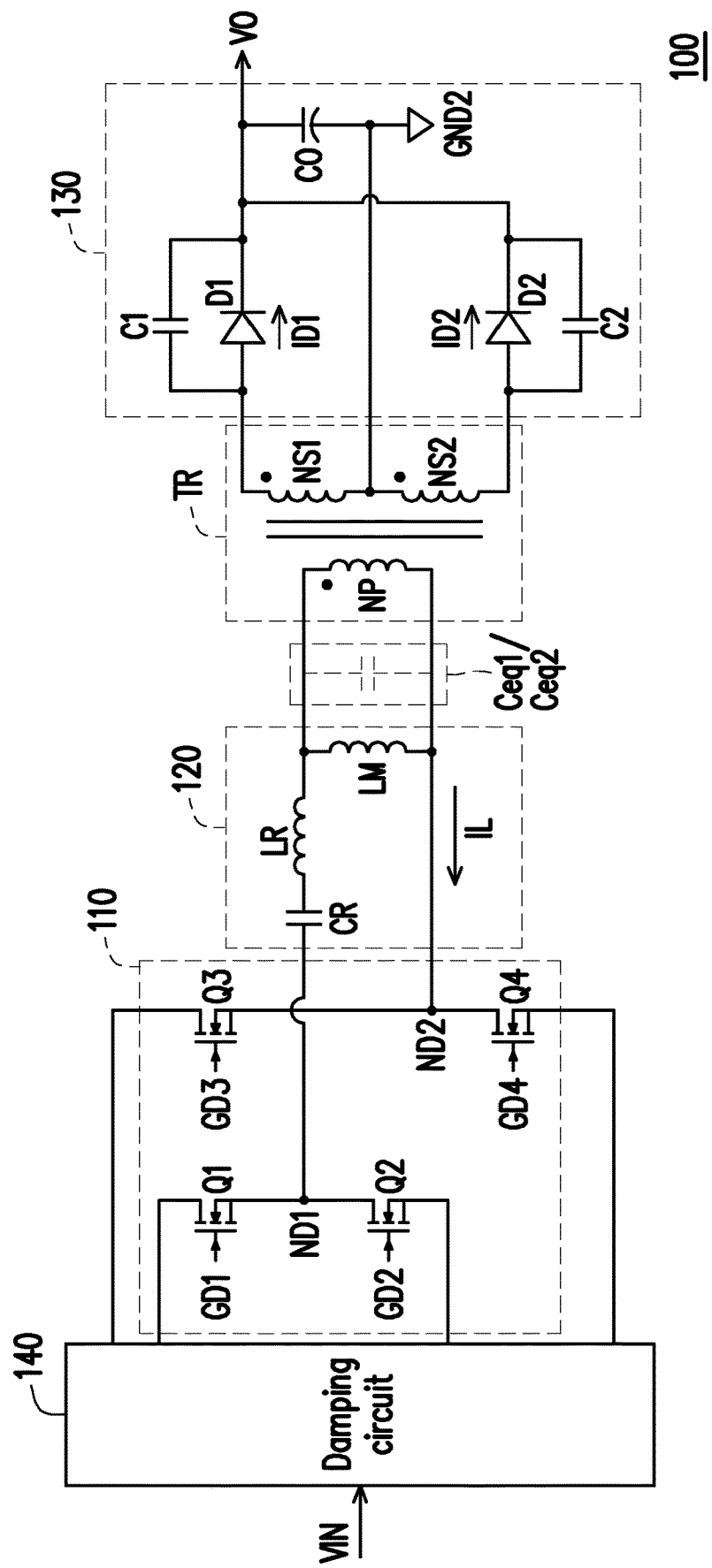
FIG. 1 is a schematic diagram of a full-bridge resonant converter according to a first embodiment of the disclosure.

Some embodiments of the disclosure accompanied with drawings are described in detail as follows. The reference numerals used in the following description are regarded as the same or similar elements when the same reference numerals appear in different drawings. These embodiments are only a part of the disclosure, and do not disclose all the possible implementation modes of the disclosure. To be more precise, the embodiments are only examples in the scope of the claims of the disclosure.

Figure 2:
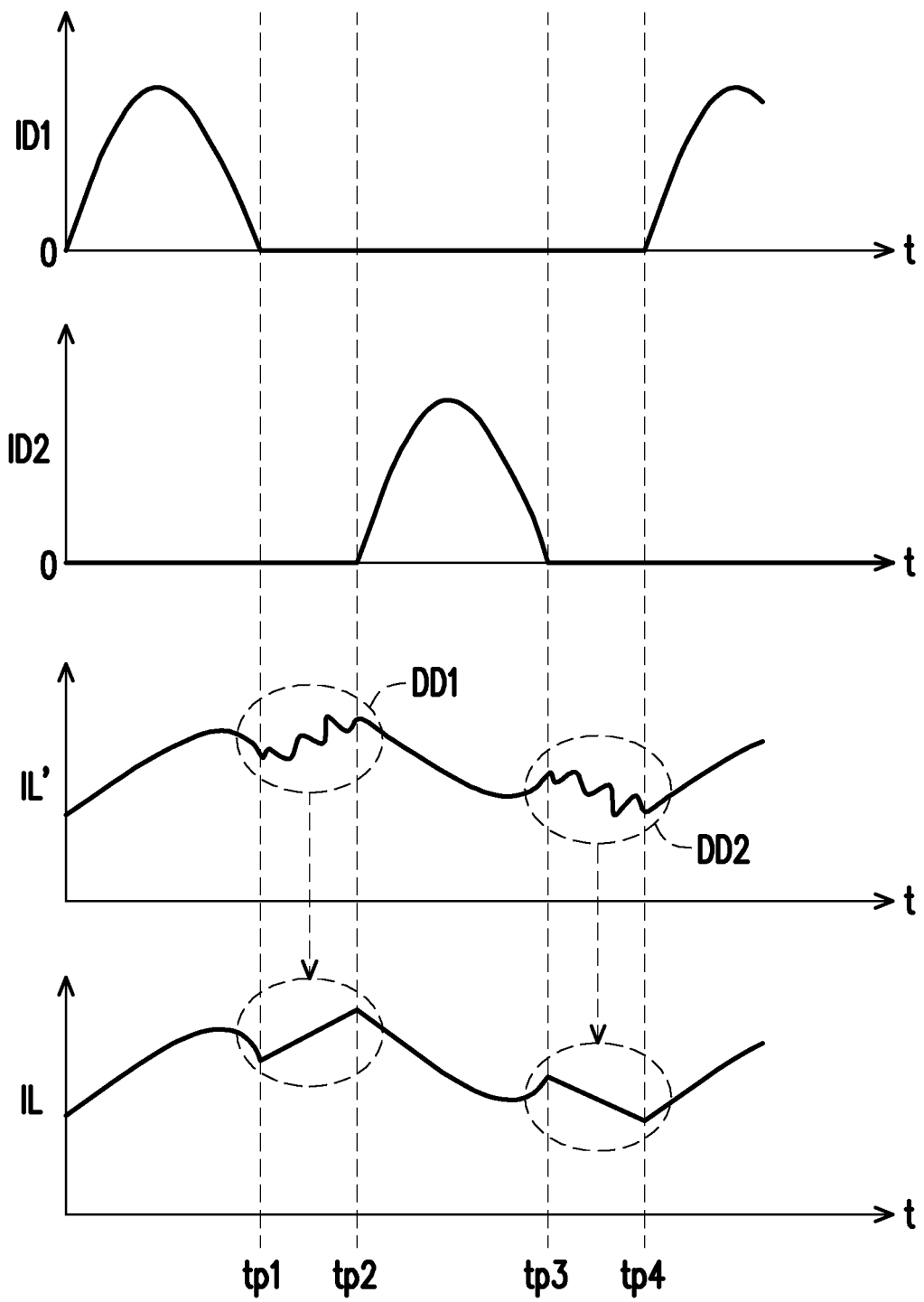
FIG. 2 is a schematic diagram of a high-frequency decoupling distortion and suppression of the high-frequency decoupling distortion according to the first embodiment.

Referring to FIGS. 1 and 2 at the same time, FIG. 1 is a schematic diagram of a full-bridge resonant converter according to a first embodiment of the disclosure. FIG. 2 is a schematic diagram of a high-frequency decoupling distortion and suppression of the high-frequency decoupling distortion according to the first embodiment. In the embodiment, a full-bridge resonant converter 100 includes a full-bridge switching circuit 110, a transformer TR, a resonance tank 120, a secondary side circuit 130, and a damping circuit 140. The transformer TR includes a primary side winding NP and secondary side windings NS1 and NS2. The resonance tank 120 is coupled to the full-bridge switching circuit 110 and the primary side winding NP.

Specifically, the full-bridge switching circuit 110 includes power switches Q1 to Q4. The first terminal of the power switch Q1 is coupled to the damping circuit 140, the second terminal of the power switch Q1 is coupled to a connection node ND1, and the control terminal of the power switch Q1 receives a control signal GD1. The first terminal of the second power switch Q2 is coupled to the connection node ND1, the second terminal of the second power switch Q2 is coupled to the damping circuit 140, and the control terminal of the second power switch Q2 receives a control signal GD2. The first terminal of the third power switch Q3 is coupled to the damping circuit 140, the second terminal of the third power switch Q3 is coupled to a connection node ND2, and the control terminal of the third power switch Q3 receives a control signal GD3. The first terminal of the fourth power switch Q4 is coupled to the connection node ND2, the second terminal of the power switch Q4 is coupled to the damping circuit 140, and the control terminal of the power switch Q4 receives a control signal GD4. The resonance tank 120 is coupled between the connection nodes ND1 and ND2. The resonance tank 120 includes a resonance capacitor CR, a resonance inductor LR, and a magnetizing inductor LM. The resonance capacitor CR, the resonance inductor LR, and the magnetizing inductor LM are coupled to each other in series. The magnetizing inductor LM is coupled in parallel to the primary side winding NP. The full-bridge resonant converter 100 converts an input power VIN into an output power VO in response to the high-frequency switching operations of the control signals GD1 to GD4.

In the embodiment, the secondary side circuit 130 is coupled to the secondary side windings NS1 and NS2. The secondary side circuit 130 includes output diodes D1 and D2 and an output capacitor CO. The damping circuit 140 is coupled to the full-bridge switching circuit 110.

Specifically, the anode of the output diode D1 is coupled to the first terminal of the secondary side winding NS1. The cathode of the output diode D1 is coupled to the output terminal of the secondary side circuit 130. The second terminal of the secondary side winding NS1 is coupled to the first terminal of the secondary side winding NS2 and a ground terminal GND2. The second terminal of the secondary side winding NS2 is coupled to the anode of the output diode D2. The cathode of the output diode D2 is coupled to the output terminal of the secondary side circuit 130. The output capacitor CO is coupled between the output terminal of the secondary side circuit 130 and the ground terminal GND2.

The high-frequency decoupling distortion is introduced first. Between time points tp1 and tp2, the current value of a current ID1 flowing through the output diode D1 is resonated to zero amperes (i.e., a zero current cutoff), and a resonant current IL' flowing through the resonance tank 120 does not flow through the primary side winding NP at all. The full-bridge resonant converter 100 enters a high-frequency decoupling state.

In the high-frequency decoupling state, there is no current in the primary side winding NP and the output diode D1 is cut off. In other words, the current value of the current flowing through the resonance inductor LR is equal to the current value of the current flowing through the magnetizing inductor LM. Furthermore, the current value of the current ID1 is resonated to zero amperes. In the high-frequency decoupling state, the resonant current IL' has a strong high-frequency fluctuation DD1 between the time points tp1 and tp2. The frequency of the high-frequency fluctuation DD1 is significantly higher than an operating frequency (e.g., 185 kHz to 250 kHz). Similarly, between time points tp3 and tp4, the current value of a current ID2 flowing through the output diode D2 is resonated to zero amperes, and the resonant current IL' does not flow through the primary side winding NP at all. The full-bridge resonant converter 100 enters another high-frequency decoupling state. In the high-frequency decoupling state, the resonant current IL' has a strong high-frequency fluctuation DD2 between the time points tp3 and tp4. The high-frequency fluctuations DD1 and DD2 are high-frequency decoupling distortions. The high-frequency decoupling distortions cause electromagnetic interference to the full-bridge resonant converter 100.

In the embodiment, between the time points tp1 and tp2, the current value of the current ID1 flowing through the output diode D1 is resonated to zero amperes, a resonant current IL flowing through the resonance tank 120 does not flow through the primary side winding NP at all, and the full-bridge resonant converter 100 enters a high-frequency decoupling state. The transformer TR and the secondary side circuit 130 jointly provide an equivalent capacitance Ceq1. The equivalent capacitance Ceq1 represents an equivalent circuit of the high-frequency decoupling state of the transformer TR and the secondary side circuit 130 between the time points tp1 and tp2. The equivalent capacitance Ceq1 is coupled in parallel to the magnetizing inductor LM. The damping circuit 140 and the equivalent capacitance Ceq1 jointly perform a first damping operation on the resonant current IL. Therefore, the high-frequency decoupling distortion between the time points tp1 and tp2 is suppressed.

In addition, between the time points tp3 and tp4, the current value of the current ID2 flowing through the output diode D2 is resonated to zero amperes, the resonant current IL does not flow through the primary side winding NP at all, and the full-bridge resonant converter 100 enters another high-frequency decoupling state. The transformer TR and the secondary side circuit 130 jointly provide an equivalent capacitance Ceq2. The equivalent capacitance Ceq2 represents an equivalent circuit of the high-frequency decoupling state of the transformer TR and the secondary side circuit 130 between the time points tp3 and tp4. The equivalent capacitance Ceq2 is connected in parallel with the magnetizing inductor LM. The damping circuit 140 and the equivalent capacitance Ceq2 jointly perform a second damping operation on the resonant current IL. Therefore, the high-frequency decoupling distortion between the time points tp3 and tp4 is suppressed. Since the high-frequency decoupling distortion in the decoupling state is suppressed, the full-bridge resonant converter 100 does not have electromagnetic interference in the high-frequency decoupling state.

In the embodiment, the secondary side circuit 130 further includes damping capacitors C1 and C2. The damping capacitor C1 is coupled in parallel to the output diode D1. The damping capacitor C2 is coupled in parallel to the output diode D2. In the high-frequency decoupling state between the time points tp1 and tp2, the equivalent capacitance Ceq1 is provided according to the primary side winding NP, the secondary side winding NS1, the output capacitor CO, and the damping capacitor C1. Furthermore, the capacitance value of the equivalent capacitance Ceq1 may be inferred according to a formula (1):

$$C\_Ceq1 = \left(\frac{C\_C1 \times C\_CO}{C\_C1 \times C\_CO}\right) \times \left(\frac{N\_NS1}{N\_NP}\right)^2 \qquad \text{formula (1)}$$

C_Ceq1 represents the capacitance value of the equivalent capacitance Ceq1. C_C1 represents the capacitance value of the damping capacitor C1. C_CO represents the capacitance value of the output capacitor CO. N_NP represents the number of turns of the primary side winding NP. N_NS1 represents the number of turns of the secondary side winding NS1. Therefore, based on the formula (1), the number of turns of the secondary side winding NS1 is divided by the number of turns of the primary side winding NP to obtain a turns ratio. The product of the square of the turns ratio and the parallel capacitance value of the output capacitor CO and the damping capacitor C1 determines the capacitance value of the equivalent capacitance Ceq1.

In addition, between the time points tp1 and tp2, the current value of the resonant current IL may be inferred according to a formula (2):

$$I\_IL(t) = ILM(t) + C\_Ceq1 \times \frac{dVLM}{dt} \qquad \text{formula (2)}$$

I_IL(t) represents the time-varying current value of the resonant current IL. ILM(t) represents the time-varying current value of the magnetizing inductor LM. VLM represents the voltage value between the terminals of the magnetizing inductor LM.

In the high-frequency decoupling state between the time points tp3 and tp4, the equivalent capacitance Ceq2 is provided according to the primary side winding NP, the secondary side winding NS2, the output capacitor CO, and the damping capacitor C2. Furthermore, the capacitance value of the equivalent capacitance Ceq2 may be inferred according to a formula (3):

$$C\_Ceq2 = \left(\frac{C\_C2 \times C\_CO}{C\_C2 \times C\_CO}\right) \times \left(\frac{N\_NS2}{N\_NP}\right)^2 \qquad \text{formula (3)}$$

C_Ceq2 represents the capacitance value of the equivalent capacitance Ceq2. C_C2 represents the capacitance value of the damping capacitor C2. C_CO represents the capacitance value of the output capacitor CO. N_NS2 represents the number of turns of the secondary side winding NS2. Therefore, based on the formula (3), the number of turns of the secondary side winding NS2 is divided by the number of turns of the primary side winding NP to obtain a turns ratio. The product of the square of the turns ratio and the parallel capacitance value of the output capacitor CO and the damping capacitor C2 determines the capacitance value of the equivalent capacitance Ceq2.

In addition, between the time points tp3 and tp4, the current value of the resonant current IL may be inferred according to a formula (4):

$$I\_IL(t) = ILM(t) + C\_Ceq2 \times \frac{dVLM}{dt} \qquad \text{formula (4)}$$

Figure 3:
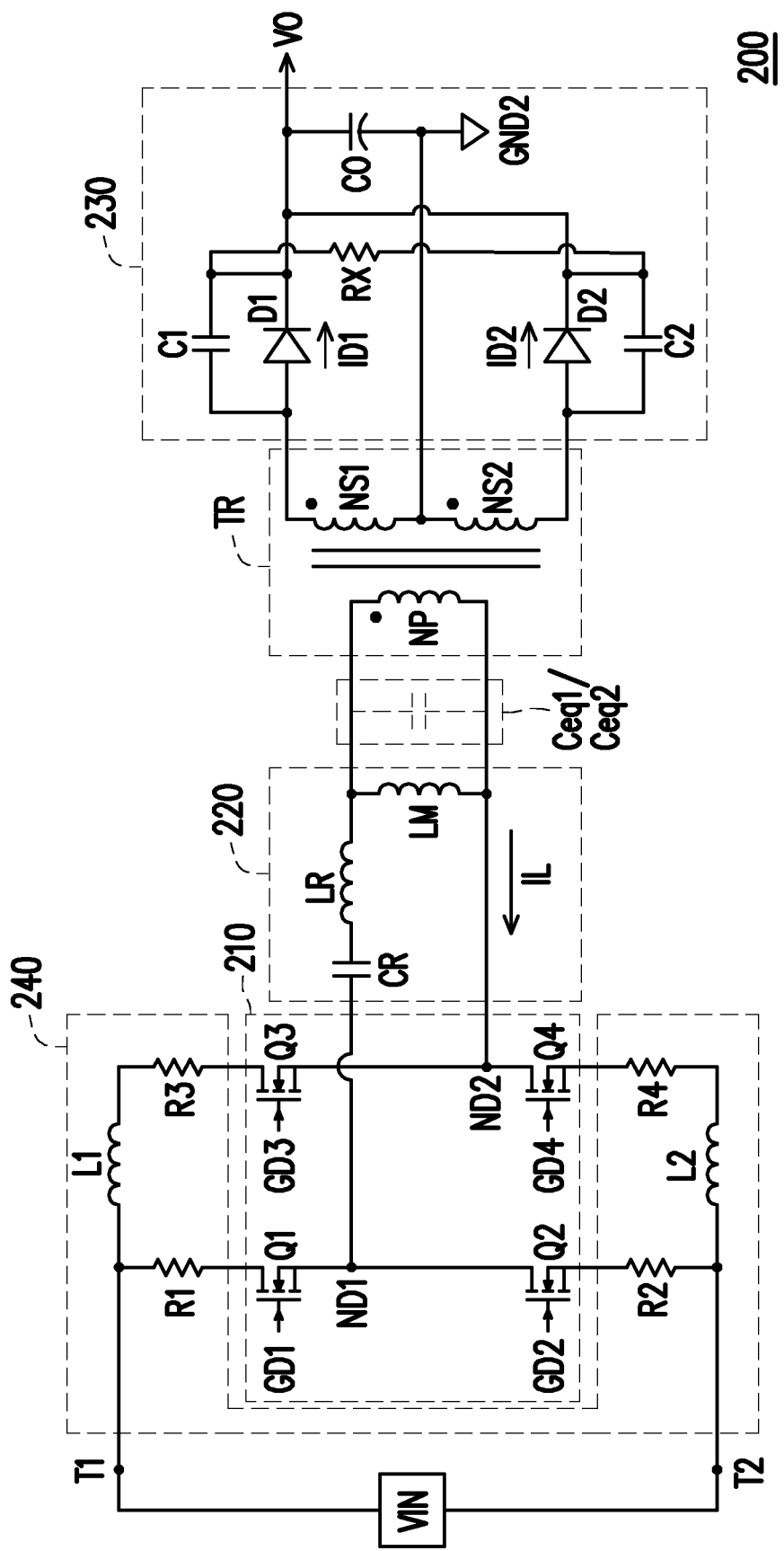
FIG. 3 is a schematic diagram of a full-bridge resonant converter according to a second embodiment of the disclosure.

FIG. 3 is a schematic diagram of a full-bridge resonant converter according to a second embodiment of the disclosure. In the embodiment, the full-bridge resonant converter 200 includes a full-bridge switching circuit 210, the transformer TR, a resonance tank 220, a secondary side circuit 230, and a damping circuit 240. The configuration of the full-bridge switching circuit 210, the transformer TR, and the resonance tank 220 is substantially similar to the configuration of the full-bridge switching circuit 110, the transformer TR, and the resonance tank 120 in the first embodiment, and thus the description is not repeated. In addition, the formation of the equivalent capacitances Ceq1 and Ceq2 in the high-frequency decoupling state has been described in detail in the embodiments of FIGS. 1 and 2, and thus the description is not repeated.

In the embodiment, the full-bridge resonant converter 200 has a first input terminal T1 and a second input terminal T2 for receiving an input power VIN. The damping circuit 240 includes resistors R1 to R4 and inductors L1 and L2. The resistor R1 is coupled between the first input terminal T1 and the first terminal of the power switch Q1. The resistor R2 is coupled between the second input terminal T2 and the second terminal of the power switch Q2. The resistor R3 and the inductor L1 are coupled in series between the first input terminal T1 and the first terminal of the power switch Q3. Taking the embodiment as an example, the first terminal of the inductor L1 is coupled to the first input terminal T1. The resistor R3 is coupled between the second terminal of the inductor L1 and the first terminal of the power switch Q3. The resistor R4 and the inductor L2 are coupled in series between the second input terminal T2 and the second terminal of the power switch Q4. Taking the embodiment as an example, the first terminal of the inductor L2 is coupled to the second input terminal T2. The resistor R4 is coupled between the second terminal of the inductor L2 and the second terminal of the power switch Q4.

Figure 4:
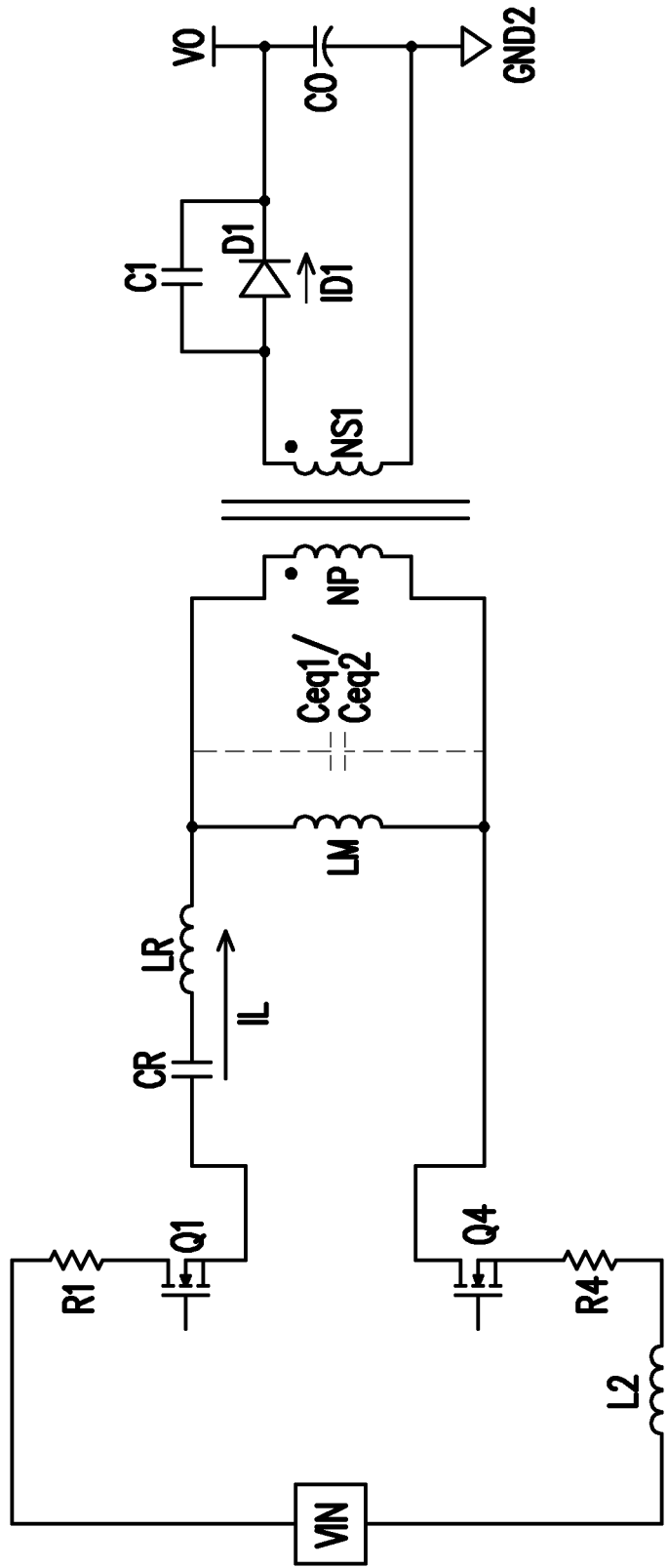
FIG. 4 is a schematic diagram of a full-bridge resonant converter 200 according to the second embodiment in a high-frequency decoupling state.
Figure 5:
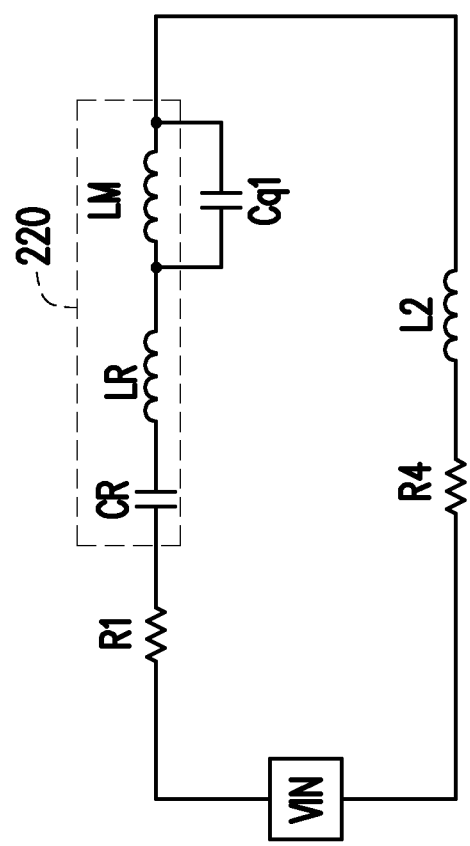
FIG. 5 is an equivalent circuit diagram according to FIG. 4.

Next, an implementation example of the full-bridge resonant converter 200 in a high-frequency decoupling state is described. Referring to FIGS. 3, 4, and 5 at the same time, FIG. 4 is a schematic diagram of the full-bridge resonant converter 200 according to the second embodiment in a high-frequency decoupling state, and FIG. 5 is an equivalent circuit diagram according to FIG. 4. FIG. 4 shows the circuit configuration of the full-bridge resonant converter 200 when the power switches Q1 and Q4 are turned on and the power switches Q2 and Q3 are turned off. In the embodiment, when the power switches Q1 and Q4 are turned on and the power switches Q2 and Q3 are turned off, the resistors R1 and R4 and the inductor L2 are provided. When the high-frequency decoupling state occurs, the equivalent capacitance Ceq1 is provided. The equivalent capacitance Ceq1 represents an equivalent circuit of the transformer TR and the secondary side circuit 130 in the high-frequency decoupling state. The equivalent capacitance Ceq1 is coupled in parallel to the magnetizing inductor LM. The equivalent circuit of the full-bridge resonant converter 200 in the high-frequency decoupling state is shown in FIG. 5. Therefore, when the current value of the current ID1 flowing through the output diode D1 is resonated to zero amperes, and the resonant current IL does not flow through the primary side winding NP at all, the resistors R1 and R4, the inductor L2, and the equivalent capacitance Ceq1 jointly perform the first damping operation on the resonant current IL.

Similarly, when the power switches Q2 and Q3 are turned on and the power switches Q1 and Q4 are turned off, the resistors R2 and R3 and the inductor L1 are provided. When the high-frequency decoupling state occurs, the equivalent capacitance Ceq2 is provided. The equivalent capacitance Ceq2 represents an equivalent circuit of the transformer TR and the secondary side circuit 130 in the high-frequency decoupling state. The equivalent capacitance Ceq2 is coupled in parallel to the magnetizing inductor LM. Therefore, when the current value of the current ID2 flowing through the output diode D2 is resonated to zero amperes, and the resonant current IL does not flow through the primary side winding NP at all, the resistors R2 and R3, the inductor L1, and the equivalent capacitance Ceq2 jointly perform the second damping operation on the resonant current IL.

Referring to the embodiment of FIG. 3 again, in the embodiment, the inductance values of the inductors L1 and L2 may be designed to be the same inductance value. The resistance values of the resistors R1 to R4 may be designed to be the same resistance value. The capacitance values of the damping capacitors C1 and C2 may be designed to be the same capacitance value. Therefore, the effect of the first damping operation is approximately equal to the effect of the second damping operation. The damping circuit 240 in the embodiment adopts a symmetrical circuit design. Such a design also facilitates the voltage tolerance of the damping circuit 240 and the full-bridge switching circuit 210 under a high frequency operation. In some embodiments, the damping circuit 240 adopts an asymmetric circuit design. In other words, one of the resistors R1 and R4 may be omitted; one of the resistors R2 and R3 may be omitted.

In some embodiments, the inductors L1 and L2 may each be different windings of a single inductive coupler. Therefore, the volume of the damping circuit 240 may be reduced.

In the embodiment, the secondary side circuit 230 further includes an auxiliary resistor RX. The auxiliary resistor RX is coupled between the cathode of the output diode D1 and the cathode of the output diode D2. The auxiliary resistor RX discharges the energy stored in the damping capacitor C1 and the energy stored in the damping capacitor C2. The auxiliary resistor RX further prevents the output diode D1 and the output diode D2 from being turned on at the same time. The auxiliary resistor RX has a low resistance value (e.g., less than 10Ω). Under the high-frequency operation, the auxiliary resistor RX can provide a discharge path for the damping capacitors C1 and C2 to dissipate the energy stored in the damping capacitors C1 and C2. With the energy stored in the damping capacitors C1 and C2 being dissipated, the output diode D1 and the output diode D2 are not turned on at the same time under the high-frequency operation. Therefore, the secondary side circuit 230 does not misoperate. In some embodiments, the auxiliary resistor RX may be omitted.

In summary, when the current value of the current flowing through the output diode is resonated to zero amperes, and the resonant current flowing through the resonance tank does not flow through the primary side winding at all, the full-bridge resonant converter enters the decoupling state. In the decoupling state, the full-bridge resonant converter provides damping operations on the resonant current flowing through the resonance tank to suppress the high-frequency decoupling distortions. As a result, the full-bridge resonant converter is free from electromagnetic interference.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the attached claims.

What is claimed is:

1. A full-bridge resonant converter, comprising:
   a full-bridge switching circuit;
   a transformer comprising a primary side winding, a first secondary side winding, and a second secondary side winding;
   a resonance tank coupled to the full-bridge switching circuit and the primary side winding;
   a secondary side circuit coupled to the first secondary side winding and the second secondary side winding, and comprising a first output diode and a second output diode;
   a damping circuit coupled to the full-bridge switching circuit, wherein
   when a current value of a first current flowing through the first output diode is resonated to zero amperes, and a resonant current flowing through the resonance tank does not flow through the primary side winding at all, the transformer and the secondary side circuit jointly provide a first equivalent capacitance, and the damping circuit and the first equivalent capacitance jointly perform a first damping operation on the resonant current; and
   a first input terminal and a second input terminal for receiving an input power supply;
   wherein the full-bridge switching circuit comprises:
   a first power switch, a first terminal of the first power switch coupled to the damping circuit, a second terminal of the first power switch coupled to a first connection node, and a control terminal of the first power switch receiving a first control signal;
   a second power switch, a first terminal of the second power switch coupled to the first connection node, a second terminal of the second power switch coupled to the damping circuit, and a control terminal of the second power switch receiving a second control signal;
   a third power switch, a first terminal of the third power switch coupled to the damping circuit, a second terminal of the third power switch coupled to a second connection node, and a control terminal of the third power switch receiving a third control signal; and
   a fourth power switch, a first terminal of the fourth power switch coupled to the second connection node, a second terminal of the fourth power switch coupled to the damping circuit, and a control terminal of the fourth power switch receiving a fourth control signal, wherein
   the resonance tank is further coupled between the first connection node and the second connection node;
   wherein the damping circuit comprises:
   a first resistor coupled between the first input terminal and the first terminal of the first power switch;
   a second resistor coupled between the second input terminal and the second terminal of the second power switch;
   a first inductor;
   a third resistor coupled in series with the first inductor between the first input terminal and the first terminal of the third power switch;
   a second inductor; and
   a fourth resistor coupled in series with the second inductor between the second input terminal and the second terminal of the fourth power switch.

2. The full-bridge resonant converter according to claim 1, wherein when a current value of a second current flowing through the second output diode is resonated to zero amperes, and the resonant current does not flow through the primary side winding at all, the transformer and the secondary side circuit jointly provide a second equivalent capacitance, and the damping circuit and the second equivalent capacitance jointly perform a second damping operation on the resonant current.

3. The full-bridge resonant converter according to claim 2, wherein the secondary side circuit further comprises:
   a first damping capacitor coupled in parallel to the first output diode;
   a second damping capacitor coupled in parallel to the second output diode; and
   an output capacitor coupled between an output terminal of the secondary side circuit and a ground terminal, wherein
   a first terminal of the first secondary side winding is coupled to an anode of the first output diode, wherein
   a cathode of the first output diode is coupled to the output terminal, wherein
   a second terminal of the first secondary side winding is coupled to a first terminal of the second secondary side winding and the ground terminal, wherein
   a second terminal of the second secondary side winding is coupled to an anode of the second output diode, wherein
   a cathode of the second output diode is coupled to the output terminal.

4. The full-bridge resonant converter according to claim 3, wherein the first equivalent capacitance is provided according to the primary side winding, the first secondary side winding, the output capacitor, and the first damping capacitor.

5. The full-bridge resonant converter according to claim 3, wherein:
- a number of turns of the first secondary side winding is divided by a number of turns of the primary side winding to obtain a turns ratio, and
- a product of a square of the turns ratio and a parallel capacitance value of the output capacitor and the first damping capacitor determines a capacitance value of the first equivalent capacitance.

6. The full-bridge resonant converter according to claim 3, wherein the second equivalent capacitance is provided according to a number of turns of the primary side winding, a number of turns of the second secondary side winding, a capacitance value of the output capacitor, and a capacitance value of the second damping capacitor.

7. The full-bridge resonant converter according to claim 3, wherein the secondary side circuit further comprises:
- an auxiliary resistor coupled between the cathode of the first output diode and the cathode of the second output diode, configured to discharge energy stored in the first damping capacitor and energy stored in the second damping capacitor, and preventing the first output diode and the second output diode from being turned on at the same time.

8. The full-bridge resonant converter according to claim 2, wherein:
- when the current value of the first current is resonated to zero amperes, and the resonant current does not flow through the primary side winding at all, the first resistor, the second inductor, the fourth resistor, and the first equivalent capacitance jointly perform the first damping operation on the resonant current, and
- when the current value of the second current is resonated to zero amperes, and the resonant current does not flow through the primary side winding at all, the second resistor, the first inductor, the third resistor, and the second equivalent capacitance jointly perform the second damping operation on the resonant current.

* * * * *